(12) United States Patent
Khan et al.

(10) Patent No.: US 11,797,443 B1
(45) Date of Patent: Oct. 24, 2023

(54) SYSTEMS AND METHODS FOR HIGH AVAILABILITY DISTRIBUTED LEDGER SYSTEM WITH CACHING

(71) Applicant: Verizon Patent and Licensing Inc., Basking Ridge, NJ (US)

(72) Inventors: Ahmed A. Khan, Plano, TX (US); Mohammed A. Qaudeer, Tampa, FL (US); Abdul Raheem, Irving, TX (US); Rasmi Ranjan Samal, Hyderabad (IN); Rangesh Sripathi, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 8 days.

(21) Appl. No.: 17/661,759

(22) Filed: May 3, 2022

(51) Int. Cl.
*G06F 12/0802* (2016.01)
*G06F 3/06* (2006.01)

(52) U.S. Cl.
CPC ........ *G06F 12/0802* (2013.01); *G06F 3/0604* (2013.01); *G06F 3/067* (2013.01); *G06F 3/0655* (2013.01); *G06F 2212/60* (2013.01)

(58) Field of Classification Search
None
See application file for complete search history.

(56) References Cited

U.S. PATENT DOCUMENTS

2018/0089642 A1\* 3/2018 Suresh ................ H04L 9/0643

OTHER PUBLICATIONS

Phuwanai Thummavet, "Demystifying Hyperledger Fabric (2/3): Private Data Collection," available at https://medium.com/coinmonks/demystifying-hyperledger-fabric-2-3-private-data-collection-164220ecafa5 (Apr. 15, 2022).

\* cited by examiner

*Primary Examiner* — Brian R Peugh

(57) ABSTRACT

A system described herein may receive a proposed interaction with a distributed ledger, including a reference to a value that has been previously recorded to the distributed ledger. The system may attempt to obtain the value from an associated cache. If the value is unable to be obtained from the cache, the system may communication with an external device via a network to obtain the value. The system may execute the proposed interaction based on the obtained first value. The system may receive a finalized block based on the executed interaction, and may update the cache based on one or more values included in the finalized block.

20 Claims, 13 Drawing Sheets

SYSTEMS AND METHODS FOR HIGH AVAILABILITY DISTRIBUTED LEDGER SYSTEM WITH CACHING

BACKGROUND

Distributed ledgers, such as blockchains, provide for the decentralized and secure storage of data. Distributed ledgers may further provide for the immutability of recorded data, as data may not be altered once recorded to a distributed ledger. High-availability ("HA") systems may deploy multiple instances of the same container, function, etc., such that if one instance fails, another instance may be used in its place.

DETAILED DESCRIPTION OF EXAMPLE EMBODIMENTS

The following detailed description refers to the accompanying drawings. The same reference numbers in different drawings may identify the same or similar elements.

Figure 1:
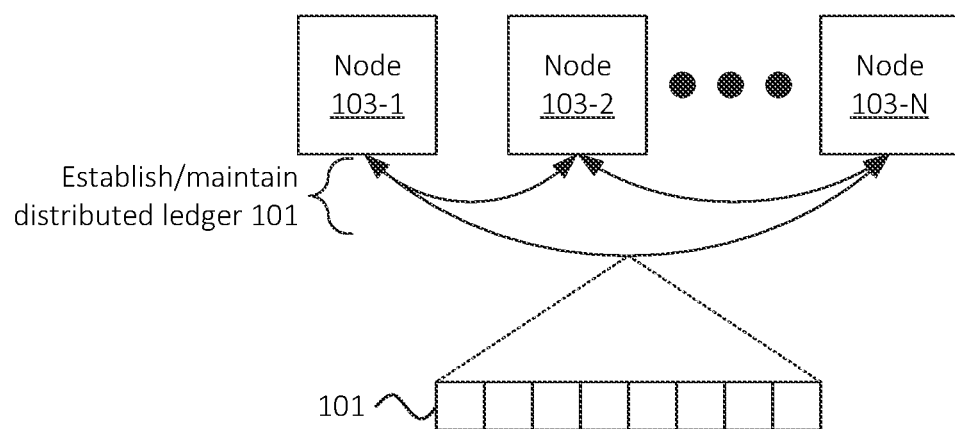
FIGS. 1, 2A, and 2B illustrate concepts associated with distributed ledgers.

Distributed ledgers (referred to herein simply as "ledgers"), such as blockchains, may provide for a decentralized, immutable mechanism by which data may be recorded and/or retrieved. For example, as shown in FIG. 1, ledger 101 may be established and/or maintained by one or more nodes 103 (e.g., nodes 103-1 through 103-N). As discussed herein, nodes 103 may also maintain a "world state" associated with ledger 101. For example, ledger 101 may include values associated with particular variables, attributes, etc. (referred to herein simply as "attributes"). Since ledger 101 is immutable, multiple versions of the same attribute may be present in ledger 101. The world state associated with ledger 101 may include the most up-to-date version (or versions) of one or more of such attributes. As discussed herein, nodes 103 may access the world state when receiving interactions, instructions, etc. to modify values associated with one or more attributes for which values have been previously recorded to ledger 101 and/or maintained in world state information associated with nodes 103.

As discussed below, nodes 103 may be implemented in a HA environment, a containerized environment, and/or some other type of implementation in which one or more nodes 103 may be implemented as multiple node instances, which may be distributed geographically and/or which may otherwise communicate via a network. Similarly, the one or more nodes 103 may include one or more devices or systems that maintain the world state associated with ledger 101, which may also be distributed geographically as compared to one or more of the node instances. In accordance with some embodiments described herein, the node instances may include a local instance cache that may be accessed more quickly (e.g., with no latency or with reduced latency) than accessing the one or more devices or systems that maintain the world state (e.g., via a network). Accordingly, embodiments herein provide for nodes 103 to gain the robustness of a HA system (e.g., if one node instance is unreachable or is not operational, then another node instance may be used), the scalability of a distributed system (e.g., the devices or systems that maintain the world state may be scaled up or down as needed), and the speed of a local cache.

Figure 2A:
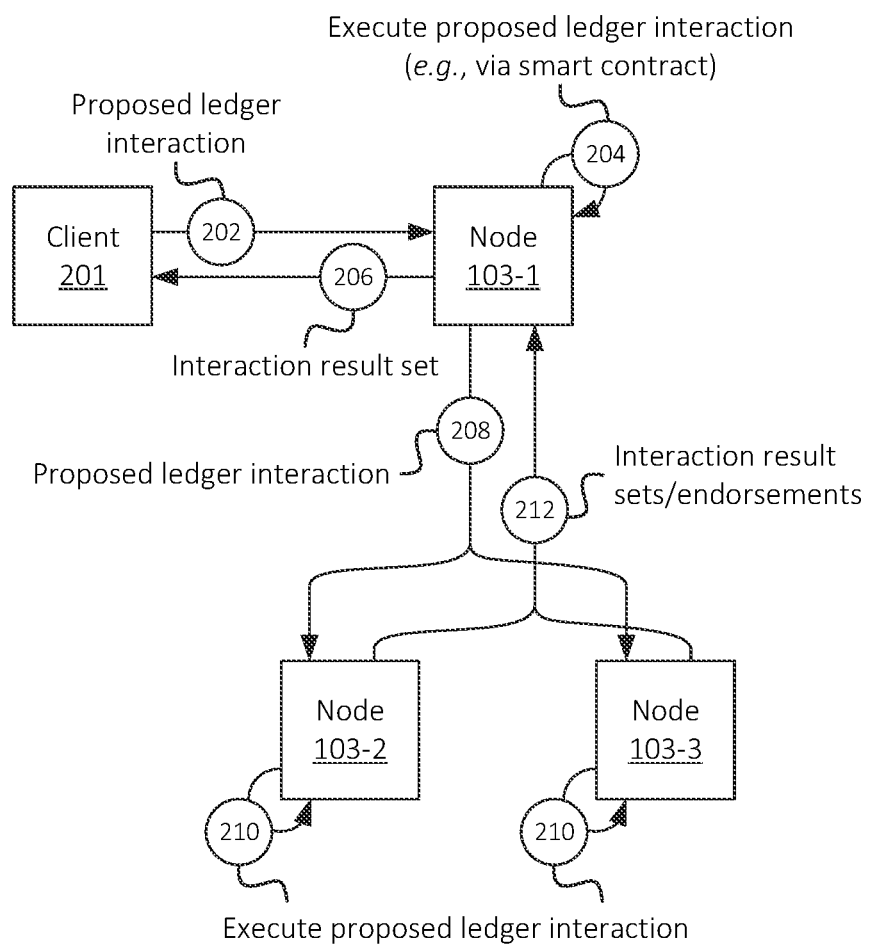
Figure 2B:
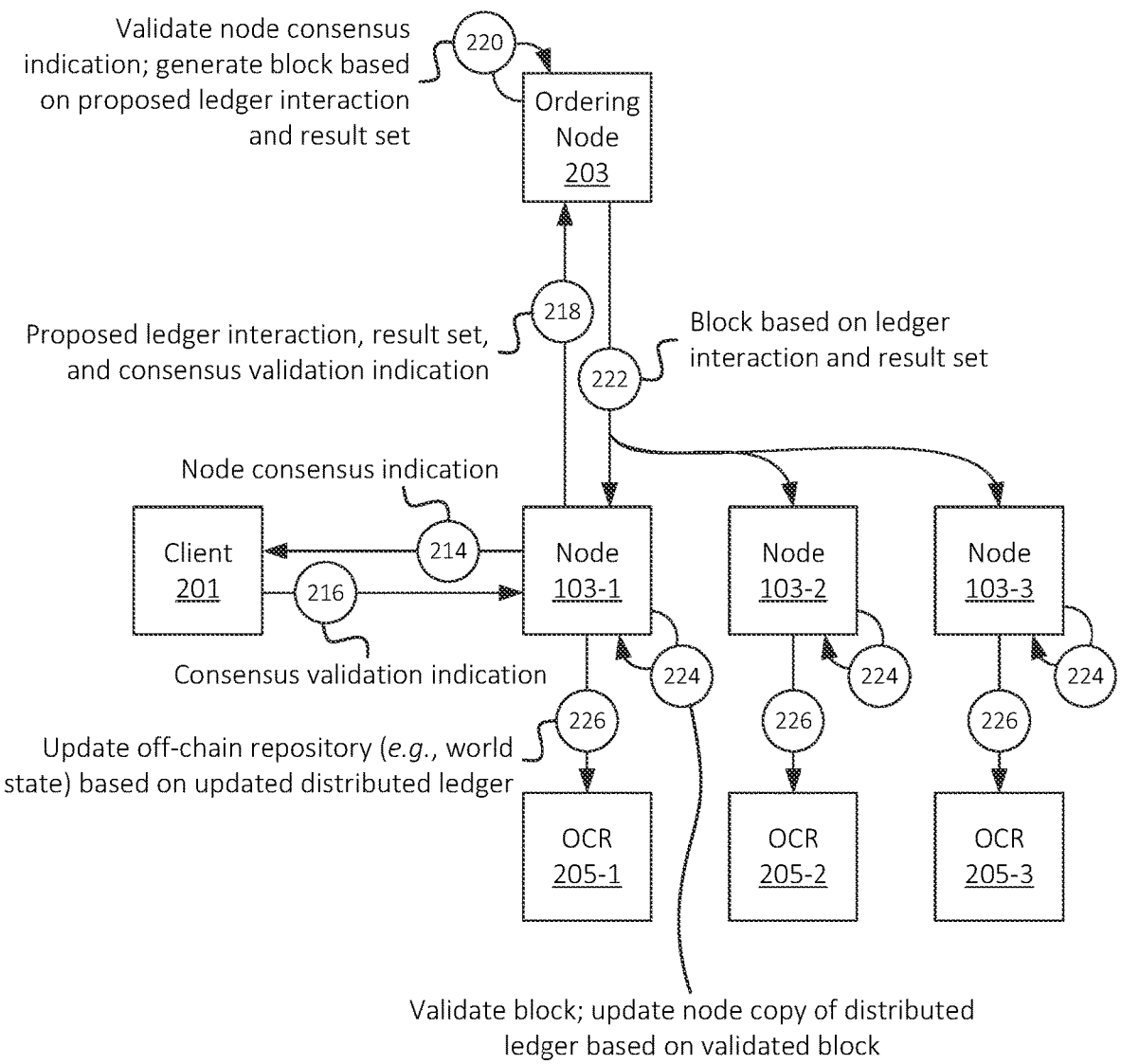

FIGS. 2A and 2B illustrate an example of modifying ledger 101 and/or world state information based on an interaction with ledger 101. As shown, a particular node 103-1 may receive (at 202) a proposed ledger interaction from a particular source, such as client 201. In some embodiments, node 103-1 may receive the proposed ledger interaction from a ledger management system (e.g., which may receive the proposed ledger interaction from client 201 and may select node 103-1 out of a group of nodes 103, such as a group of nodes associated with the same channel in a channel-based ledger system, such as the Hyperledger Fabric), an ordering node, or other suitable device or system.

Client 201 may be, for example, an entity associated with ledger 101 (e.g., may be associated with an address, a "wallet," a decentralized application ("dApp"), etc.). In this example, assume that client 201 is authorized to initiate, request, etc. the proposed ledger interaction, which may include the modification of one or more values of one or more attributes that are currently associated with ledger 101, the addition of one or more attributes to ledger 101, or other suitable interactions. In other examples, node 103-1 and/or some other device or system may verify that client 201 is authorized to initiate the proposed ledger interaction (e.g., as specified in one or more smart contracts, as specified by access parameters associated with ledger 101, etc.).

In some embodiments, the proposed ledger interaction (received at 202) may indicate a smart contract recorded to ledger 101, which may specify one or more inputs (e.g., types of inputs, quantity of inputs, and/or other input parameters), and may also include actions to take with respect to the inputs in order to generate one or more outputs (sometimes referred to as "chaincode"). For example, the proposed ledger interaction may specify a particular smart contract (e.g., an address associated with ledger 101 with which the smart contract is associated) and one or more input values according to input parameters specified by the particular smart contract. In some examples, the proposed ledger interaction may refer to one or more values that have previously been recorded to ledger 101 (and thusly reflected in world state information associated with ledger 101), such as an interaction that increments or decrements previously recorded values or performs other computations based on previously recorded values.

Node 103-1 may execute (at 204) the proposed ledger interaction, which may include accessing the one or more values that were previously recorded to ledger 101. In order to determine the one or more values referred to in the proposed ledger interaction, node 103-1 may access world state information, maintained by node 103-1, to determine such values. As discussed below, in a HA and/or containerized environment, such access may include checking a local cache and/or accessing, via a network, a remote system (e.g., a "cloud" system, a containerized system, etc.) associated with node 103-1 that maintains the world state associated with ledger 101. The execution (at 204) may be a "simulation" of the proposed ledger interaction, inasmuch as the execution and of the proposed ledger interaction and the ensuing result may not yet be recorded to ledger 101. For example, as discussed below, the interaction may be "final" or "committed" based on validation by one or more other nodes. In some embodiments, the result may include a "read-write set," which may include the values of the one or more attributes that were accessed (e.g., the values based on which the interaction was performed), as well as the resulting values after execution of the proposed interaction.

Node 103-1 may provide (at 206) the result set (e.g., the read-write set) based on executing (at 204) the proposed interaction to client 201. Client 201 may maintain the result set to, for example, verify and/or to provide approval of the result set before the result set is committed to ledger 101. Node 103-1 may also provide (at 208) the proposed ledger interaction to one or more other nodes, such as nodes 103-2 and 103-3. In some embodiments, node 103-1 may provide (at 208) the result set generated by node 103-1 to nodes 103-2 and 103-3. Nodes 103-1 through 103-3 may all be associated with the same channel, nodes 103-2 and 103-3 may be specified by the smart contract as validators, and/or nodes 103-2 and 103-3 may otherwise be identified by node 103-1 as nodes that should validate, endorse, etc. the execution and result of the proposed interaction.

As similarly discussed with respect to node 103-1, nodes 103-2 and 103-3 may execute (at 210), and/or simulate the execution of, the proposed interaction. Accordingly, nodes 103-2 and 103-3 may access one or more values that were previously recorded to ledger 101 using world state information maintained by nodes 103-2 and 103-3, and in an HA and/or containerized environment such as described below, such access may include checking a local cache and/or accessing, via a network, a remote system associated with nodes 103-2 or 103-3 that maintains the world state associated with ledger 101. In some embodiments, nodes 103-2 and 103-3 may validate, verify, etc. the result set generated by node 103-1 by comparing the result set with respective result sets generated by nodes 103-2 and 103-3. Nodes 103-2 and 103-3 may respond (at 212) to node 103-1 with respective result sets generated by nodes 103-2 and 103-3, and/or may respond with an indication, endorsement, etc. (e.g., which may be respectively signed by nodes 103-2 and 103-3) that the result set generated by node 103-1 is valid. Once node 103-1 has received endorsements from at least a threshold quantity of other nodes (e.g., from nodes 103-2 and 103-3, in this example), node 103-1 may determine that a consensus has been reached with respect to the result set for the proposed interaction.

As shown in FIG. 2B, node 103-1 may accordingly provide (at 214), to client 201, an indication that consensus for the result set (provided at 206) has been reached. In some embodiments, client 201 may validate the consensus (e.g., by evaluating signatures of nodes 103-2 and 103-3) and/or may verify the result set (e.g., by itself executing the proposed interaction). Client 201 may provide (at 216), to node 103-1, an indication that client 201 has validated the consensus and/or has verified the result set. In some embodiments, the consensus validation indication may be signed by client 201, thus securely authenticating the validation by client 201.

Node 103-1 may provide (at 218) the result set, along with the consensus validation indication and the proposed ledger interaction, to ordering node 203. Ordering node 203 may be a node, associated with the same channel as nodes 103-1 through 103-3, that validates (at 220) the consensus validation indication (e.g., validates signatures associated with client 201 and/or nodes 103-1 through 103-3) and generates a block, to be recorded to ledger 101, that includes information regarding the ledger interaction. Such information may include an identifier of client 201 (e.g., an address, wallet identifier, etc.), identifiers of nodes 103-1 through 103-3 that participated in generating and/or validating the result set based on the ledger interaction, smart contract inputs provided by client 201, the consensus validation indication, one or more timestamps of the above operations and/or other events, and/or other suitable information associated with the ledger interaction. In some embodiments, the block may be signed by ordering node 203, thus securely authenticating the block creation by ordering node 203. At this point, the ledger interaction may no longer be a "proposed" ledger interaction, as the interaction has been finalized, committed, etc. by ordering node 203.

Ordering node 203 may propagate (at 222) the signed block, including information regarding the finalized ledger interaction initiated by client 201, to nodes 103-1 through 103-3 and/or other nodes associated with the same channel. Nodes 103-1 through 103-3 may validate (at 224) the block, which may include verifying the signature of ordering node 203, and may accordingly update a respective copy of ledger 101 as maintained by each one of nodes 103-1 through 103-3. Nodes 103-1 through 103-3 may maintain respective independent copies of ledger 101, thus providing an element of decentralization to ledger 101. As such, when adding the block (received at 222), nodes 103-1 through 103-3 may continue to maintain separate copies of the same ledger 101, including the information regarding the finalized ledger interaction.

Nodes 103-1 through 103-3 may also maintain off-chain repositories 205, which may be used to maintain world state information. For example, as discussed above, world state information may include a portion of the information stored in ledger 101, such as the latest version of some or all of the attributes for which information has been recorded to ledger 101. Nodes 103-1 through 103-3 may accordingly update (at 226) respective copies of world state information based on the received block. For example, in the event that the block includes a change in the value of a particular attribute, nodes 103-1 through 103-3 may update world state information (e.g., as respectively stored in off-chain repositories 205-1 through 205-3) to replace a previous value of the attribute (e.g., a previous version of the attribute) with the newly received value of the particular attribute.

Figure 3:
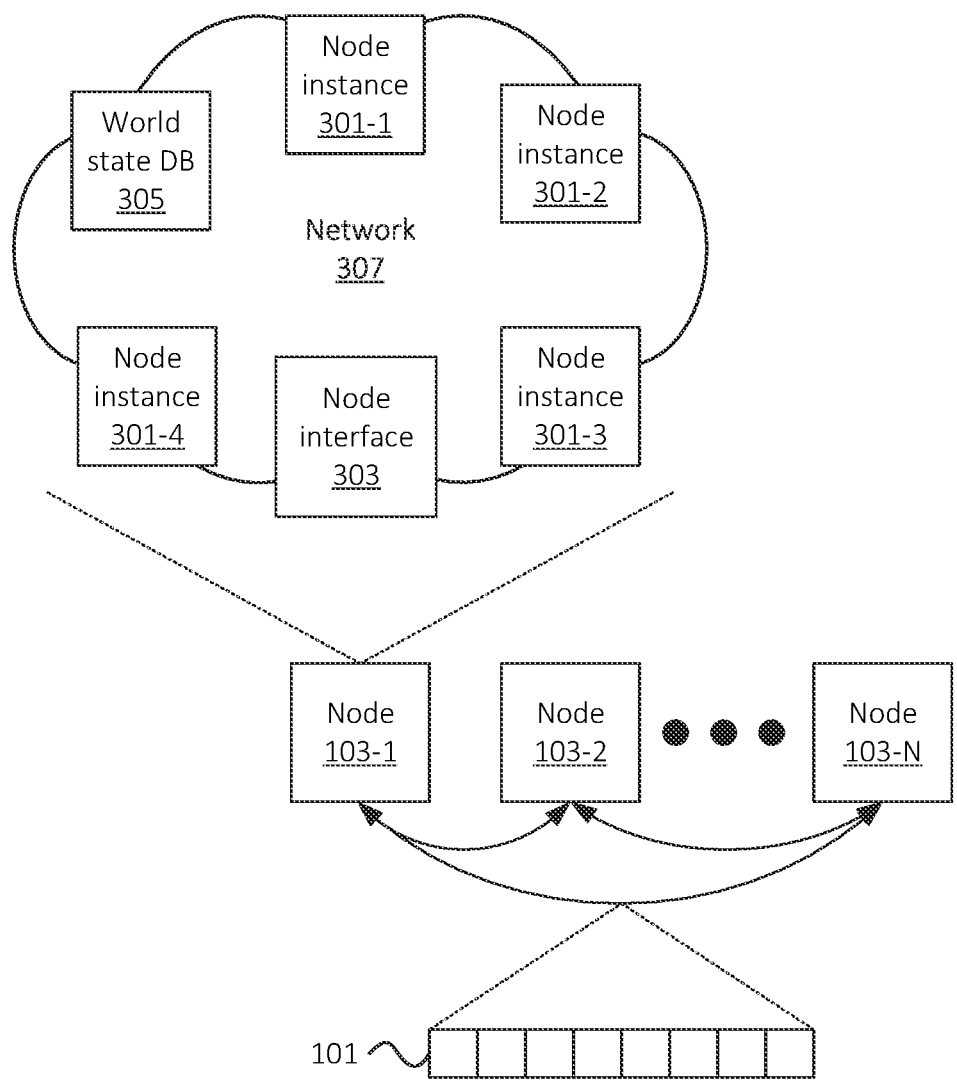
FIG. 3 illustrates an example arrangement of a node, associated with a distributed ledger, that is implemented in a containerized environment, in accordance with some embodiments.

As noted above, in accordance with some embodiments, one or more nodes 103 may be implemented as in an HA environment, in which a particular node 103 may be implemented by multiple node instances. For example, as shown in FIG. 3, node 103-1 may be implemented by a set of node instances (e.g., node instances 301-1 through 301-4), node interface 303, and world state database 305. The various devices or systems that implement node 103-1 (i.e., node instances 301-1 through 301-4, node interface 303, and world state database 305, in this example) may be geographically distributed and/or may otherwise be implemented by different devices, systems, datacenters, or the like, and may communicate with each other via network 307 (e.g., the Internet, a wireless network, or some other type of network).

Each node instance 301 may be and/or may include a duplicate of each other node instance 301. In some embodiments, node instances 301 may each be or include a container, a virtual machine, or other type of deployable device or system. In some embodiments, each node instance 301 may be capable of performing some or all of the functions described above with respect to node 103, such as executing smart contracts, validating and/or committing blocks to ledger 101, etc.

Node interface 303 may serve as an interface between node 103-1 and entities external to node 103-1. For example, when receiving communications from client 201 and/or other nodes 103 (e.g., proposed ledger interaction 202, endorsements 212, consensus validation indications 216, finalized blocks 222, etc.), node interface 303 may select a particular node instance 301 and may provide the communication to the selected node instance 301. Node interface 303 may include, for example, a load balancer or other suitable function that selects a particular node instance 301 to handle a given communication based on measures of load associated with node instances 301 with which node interface 303 is associated, a geographical location of node instance 301, an availability of node instance 301, a status of node instance 301 (e.g., whether node instance 301 is "operational," "reachable," "not operational," "not reachable," etc.) and/or other suitable factors. In some embodiments, node interface 303 may randomly select a given node instance 301, may select a given node instance 301 in a "round-robin" scheme, and/or may select a given node instance 301 in some other suitable manner. Node interface 303 may receive communications from respective node instances 301 (e.g., interaction result sets 206, proposed ledger interactions 208, endorsements 212, node consensus indications 214, consensus validation indications 218, etc.), and may forward such communications to their destinations. In some embodiments, node interface 303 may include and/or may be communicatively coupled to an orchestrator or other suitable type of device or system that provisions, installs, instantiates, etc. node instances 301 on various cloud systems, datacenters, servers, virtual machines, etc. in order to provide a measure of reliability or robustness, and/or based on other factors. In some implementations, node interface 303 may receive status information from node instances 301 and/or an orchestrator to determine availability of node instances 301, and may use the availability of a particular node instance 301 as part of the selection criteria for selecting a node instance 301 to service a client communication (e.g., not selecting a node instance 301 that is determined to be unavailable, not operational, associated with availability or performance metrics that are below a threshold, etc.).

External devices or systems (e.g., client 201, other nodes 103, etc.) may be "unaware" of the implementation of a given node 103 (e.g., node 103-1, in the example of FIG. 3) as an HA system that includes multiple node instances 301. Further, while some nodes 103 may be implemented as an HA system (e.g., that includes multiple node instances 301), other nodes 103 may be implemented as a single device or system (e.g., without multiple instances).

World state database 305 may include one or more devices or systems that maintain a world state, based on ledger 101, for node 103. For example, as discussed above, world state database 305 may maintain a latest version of some or all attributes for which values are stored in ledger 101. Although world state database 305 is referred to herein as a "database," in some embodiments, world state database 305 may include some other form of data repository or data structure that maintains the information discussed herein.

Figure 4:
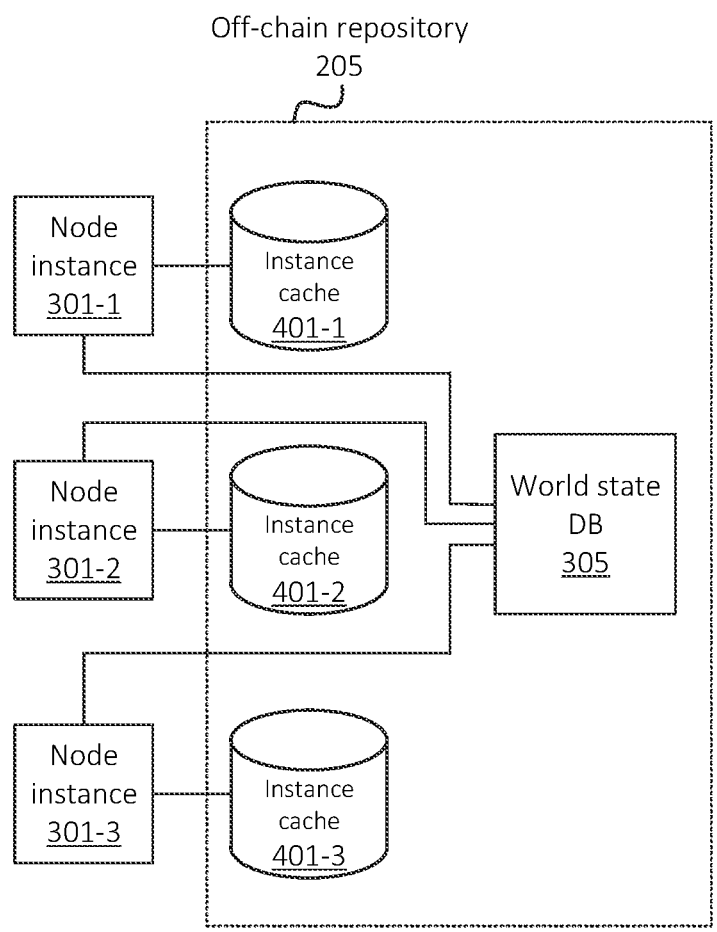
FIG. 4 illustrates an example arrangement of an off-chain repository including a world state database and one or more node instance caches, in accordance with some embodiments.

World state database 305 may, in some embodiments, be an example of a particular off-chain repository 205 associated with a given node 103. In accordance with some embodiments, as shown in FIG. 4, a particular off-chain repository 205 associated with a particular node 103 may include world state database 305 (e.g., a particular device, system, or set of devices or systems) as well as one or more instance caches 401. For example, in some embodiments, each node instance 301 may be associated with a respective instance cache 401, and may also be communicatively coupled to world state database 305. World state database 305 may include, for example, relatively large data storage devices and/or may itself be implemented as an HA system (e.g., multiple instances, devices, etc. that implement world state database 305), a cloud system, etc. As noted above, each node instance 301 may communicate with world state database 305 via network 307.

On the other hand, each instance cache 401 may be local to each respective node instance 301, such as an "onboard" storage device associated with node instance 301, and/or a storage device (or set of storage devices) that communicates with node instance 301 via some other communication pathway other than network 307. For example, in some embodiments, node instance 301 and instance cache 401 may communicate via a device bus, a physical slot or interface, or the like. In some embodiments, node instance 301 may be implemented as a container on a particular device or set of devices, and instance cache 401 may be implemented by hardware (e.g., one or more storage devices) that are integrated within, are attached to, are connected to, etc. the particular device or set of devices. In some embodiments, node instance 301 and instance cache 401 may communicate via a "private" network, such as a Local Area Network ("LAN"), an enterprise network, or the like, while node instance 301 and world state database 305 may communicate via a "public" network, such as the Internet. In some embodiments, node instance 301 and instance cache 401 may be associated with a first set of Quality of Service ("QoS") parameters, Service Level Agreements ("SLAs"), or the like, while node instance 301 and world state database 305 may be associated with a second set of QoS parameters, SLAs, or the like. For example, by way of such differing QoS parameters, SLAs, etc., communications between node instance 301 and instance cache 401 may be faster than communications between node instance 301 and world state database 305. Inasmuch as instance cache 401 may be "onboard" with respect to node instance 301 and/or may otherwise communicate with node instance 301 faster than world state database 305 (e.g., as discussed above), instance cache 401 may be considered "local" with respect to node instance 301, while world state database 305 may be considered "remote" with respect to node instance 301.

As discussed herein, operations related to off-chain repository 205 (e.g., executing (at 204 and/or 210) a proposed ledger interaction, updating (at 226) off-chain repository 205 based on finalized ledger interactions, and/or other operations) may be performed based on information stored by world state database 305 and/or respective instance caches 401. In situations where a given instance cache 401 is used for such operations in lieu of world state database 305, such operations may be performed more quickly (e.g., with lower latency), based on reduced communications latency between respective node instances 301 and instance caches 401 than between such node instances 301 and world state database 305. Additionally, or alternatively, the operations may be performed more quickly when instance caches 401 are used, in embodiments where instance caches 401 are implemented by faster storage devices (e.g., flash memory, Random Access Memory ("RAM"), Solid State Disks ("SSDs"), storage devices with relatively high speed and relatively small capacity, etc.) than storage devices that are used to implement world state database 305 (e.g., platter drives, storage devices with relatively low speed and relatively large capacity, etc.).

Figure 5A:
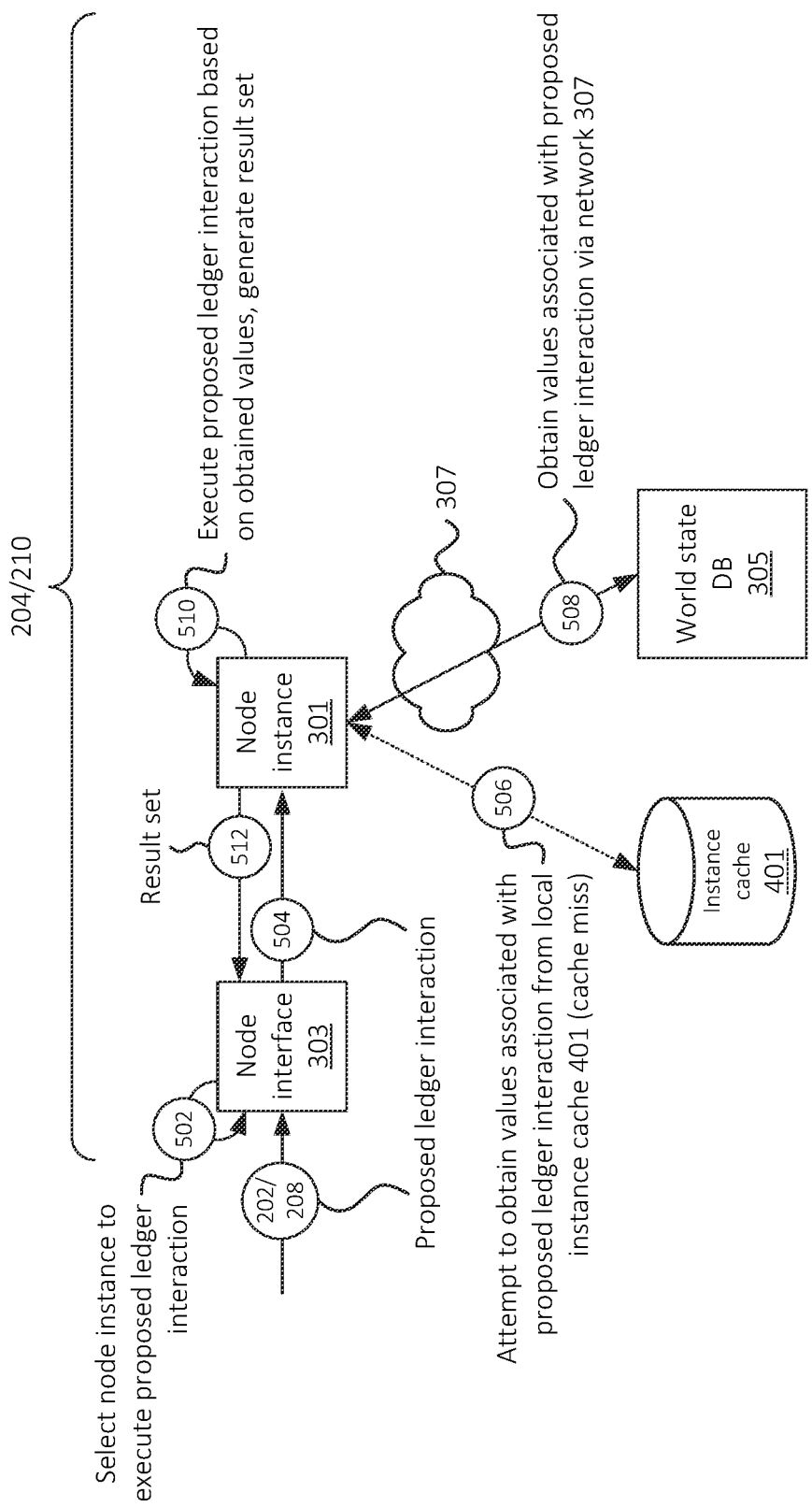
FIGS. 5A and 5B illustrate examples of using an instance cache to execute interactions with a distributed ledger, in accordance with some embodiments.
Figure 5B:
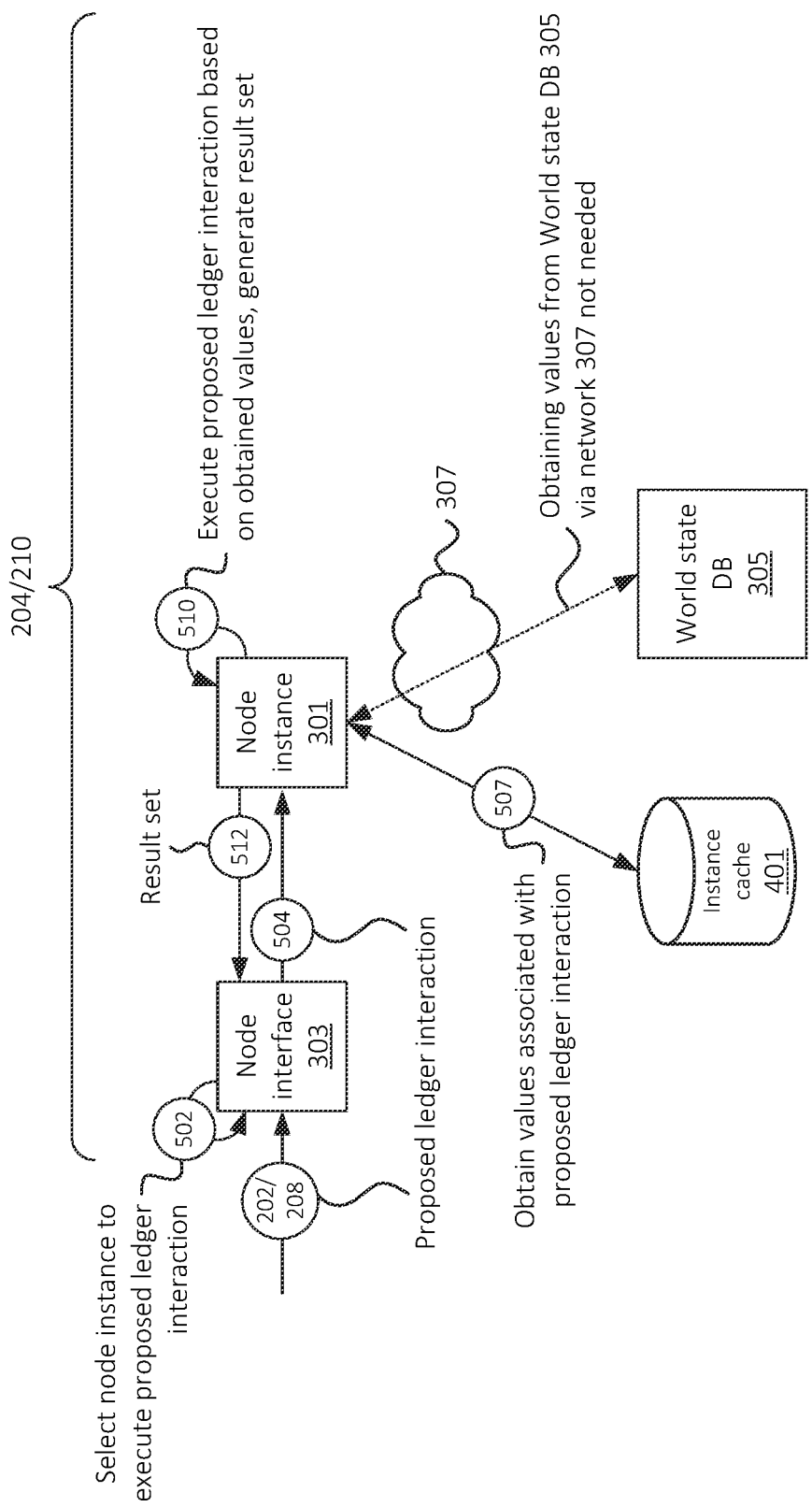

FIGS. 5A and 5B illustrate example scenarios in which a particular node instance 301 may use instance cache 401 and/or world state database 305 in order to execute (e.g., at 204 and/or 210) a proposed ledger interaction based on world state information. For example, as shown, node interface 303 may receive (at 202 and/or 208, as discussed above) a proposed ledger interaction. For example, node interface 303 may receive (at 202) the proposed ledger interaction from client 201, may receive (at 208) the proposed ledger interaction from another node 103, and/or may receive the proposed ledger interaction from some other source. In the examples discussed herein, the proposed ledger interaction includes a modification to one or more values of one or more attributes maintained in ledger 101 (and, accordingly, in world state information associated with ledger 101, as maintained by node instance 301 in instance cache 401 and/or world state database 305). In some scenarios, similar concepts may apply to ledger interactions that include queries, access requests, etc. for values of attributes maintained in ledger 101 (e.g., where such ledger interactions do not include a modification to such values).

Node interface 303 may select (at 502) a particular node instance 301 out of a group of node instances 301 associated with a particular node 103 to execute the proposed ledger interaction. For example, as discussed above, node interface 303 may make such a selection based on availability, load balancing techniques, and/or other suitable selection techniques. Node interface 303 may accordingly provide (at 504) the proposed ledger interaction to the selected node instance 301, such as via a network, a device bus, an application programming interface ("API"), and/or some other suitable communication pathway. As discussed above, the proposed ledger interaction may include a modification to values of one or more attributes stored in ledger 101 maintained by node 103 (e.g., by node instance 301), which may be stored in world state information maintained in world state database 305 and, in some situations, instance cache 401.

Node instance 301 may attempt (at 506) to obtain such values from instance cache 401. In this example, instance cache 401 may not include such values (e.g., a "cache miss"). For example, the requested values may not have previously been stored by instance cache 401. Additionally, or alternatively, such values may have previously been stored by instance cache 401, but may have been removed, cycled out, evicted, etc. based on a quantity of times such values were accessed (e.g., infrequently accessed values may be more likely to be removed such that more heavily accessed values may be retained in instance cache 401), a time of last access (e.g., values that were accessed more recently may be less likely to be removed), a time of initial creation (e.g., a time at which the values were recorded to ledger 101 or to instance cache 401), and/or based on other suitable factors. Generally, the removal of portions of the world state information may reduce the amount of storage resources consumed by instance cache 401, and may enhance the speed of access of such values (e.g., in situations where the values are stored by instance cache 401).

As the values were not able to be obtained (at 506) from instance cache 401, node instance 301 may obtain (at 508) the values associated with the proposed ledger transaction from world state database 305. Node instance 301 may accordingly execute (at 510) the proposed ledger interaction based on the obtained values, and generate a result set, as similarly discussed above. Node instance 301 may provide (at 512) the result set to node interface 303, which may provide (at 206) the result set to client 201, may provide (at 212) the result set to another node 103, and/or may provide the result set to some other device or system. For example, in some embodiments, the result set generated by a particular node instance 301 associated with a given node 103 may be a representative result set of node 103.

In the examples discussed herein, assume that the requested values are stored by world state database 305, and that world state database 305 is accordingly able to return (at 508) the requested values. In other situations, the values may not be stored by world state database 305, such as when the proposed transaction includes an error or for some other reason. In such situations, world state database 305 may indicate (at 508) an error or failure to locate the requested values, based on which node instance 301 may determine that the proposed ledger interaction is invalid.

As discussed above, node instance 301 may communicate with world state database 305 via network 307. On the other hand, node instance 301 may communicate with instance cache 401 via some other communication pathway that provides lower latency, greater speed, etc. than network 307, such as a device bus, a LAN, a physical interface, shared resources on the same physical device, etc. Thus, if node instance 301 were able to obtain the requested values from instance cache 401, such obtaining may occur more quickly (e.g., with less latency) than obtaining such values from world state database 305 via network 307.

For example, as shown in FIG. 5B, after receiving (at 504) a proposed ledger interaction, node instance 301 may obtain (at 507) values associated with the proposed ledger interaction from instance cache 401. As such, obtaining the values from world state database 305 may not be needed, and the obtaining (at 507) of the values from instance cache 401 may be faster than obtaining the values from world state database 305 via network 307 would have been. As such, node 103 with which node instance 301 is associated may be able to more quickly execute the proposed ledger interaction, therefore enhancing the overall efficiency and speed with which ledger 101 is maintained.

The requested values may have been previously provided to instance cache 401 as part of a periodic, intermittent, ongoing, etc. update procedure. Such update procedure may include instance caches 401, associated with various node instances 301 of node 103, monitoring world state database 305 for updates and update stored world state information accordingly. Additionally, or alternatively, such update procedure may include world state database 305 (or some other device or system) "pushing" updates to node instances 301 on an ongoing basis. In some embodiments, node instances 301 may receive updates to world state information and/or to ledger 101 from other node instances 301, based on which associated instance caches 401 may be updated.

Figure 6:
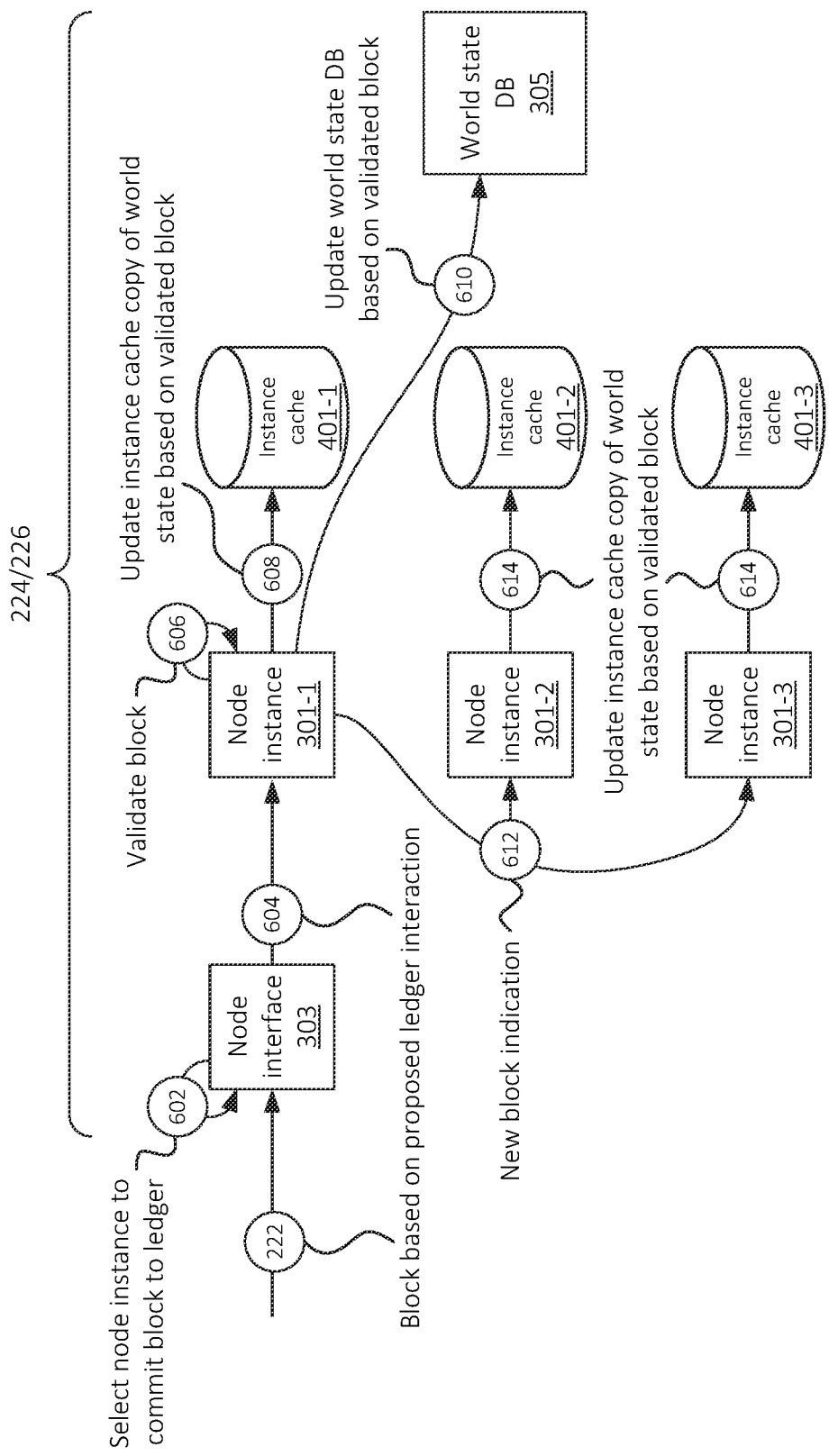
FIG. 6 illustrates an example of updating one or more instance caches associated with one or more node instances based on a modification to a distributed ledger, in accordance with some embodiments.

For example, as shown in FIG. 6, node interface 303, associated with a particular node 103, may receive (at 222) a block based on a proposed ledger interaction. For example, as discussed above, the block may be received from ordering node 203 based on ordering node 203 receiving consensus information for a finalized ledger interaction for which the block includes one or more records. Node interface 303 may select (at 602) a particular node instance 301-1 (out of candidate node instances 301-1 through 301-3) to validate the block, and may provide (at 604) the block to node instance 301-1. As similarly discussed above, node instance 301-1 may validate (at 606) the block by validating a signature of ordering node 203 and/or by performing other suitable operations.

Based on the information included in the block, which may include one or more attributes and one or more values associated with such attributes, node instance 301-1 may update (at 608) instance cache 401-1. For example, node instance 301-1 may modify a previous version of a particular attribute, as stored by instance cache 401-1, with a new version of the particular attribute, where the new version reflects a new value for the attribute based on the received and validated block. Additionally, or alternatively, node instance 301-1 may add the attribute to instance cache 401-1, along with the value included in the received block, in situations where instance cache 401-1 does not already include the attribute. In this manner, when node instance 301-1 attempts to access instance cache 401-1 to obtain the value for the attribute (e.g., at 507), node instance 301-1 may be able to obtain the value for the attribute without needing to access world state database 305 for the value. In some embodiments, as noted above, instance cache 401-1 may be associated with one or more mechanisms by which older data, less frequently used data, etc. may be removed, evicted, etc. based on the addition of attributes to instance cache 401-1 that were not previously stored in instance cache 401-1.

Node instance 301-1 may also provide (at 610) the received block, and/or some or all of the attributes and/or values included therein, to world state database 305. In this manner, world state information (e.g., the latest values for some or all attributes included in ledger 101) world state database 305 may be updated based on the values included in the new block. Although not shown, node instance 301-1 may also update (e.g., at 224, as similarly discussed above) a copy of ledger 101, maintained by node 103 with which node instance 301-1 is associated. For example, node instance 301-1 may append the new block to ledger 101, associated with node 103. In some embodiments, the same device or system may maintain world state database 305 as well as the node copy of ledger 101. In some embodiments, different devices or systems may maintain world state database 305 and the node copy of ledger 101.

Other instance caches 401-2 and 401-3, associated with node instances 301-2 and 301-3, may also be updated based on the new block. For example, node instance 301-1 may communicate (at 612) an indication of the new block or some portion thereof (e.g., the attributes added/changed due to transactions within the block) to node instances 301-2 and 301-3, such as via a "gossip" mechanism via which node instances 301 communicate with each other to indicate new blocks for ledger 101, changes to the world state associated with ledger 101, etc. In a manner similar to that discussed above with respect to node instance 301-1 and instance cache 401-1 (at 608), node instances 301-2 and 301-3 may update (at 614) respective instance caches 401-2 and 401-3 based on the information included in the communication (e.g., may update world state information stored in instance caches 401-2 and 401-3). Additionally, or alternatively, instance caches 401-2 and 401-3 may receive the updated world state information in some other suitable manner, such as via "push" or "pull" communications with world state database 305 or some other device or system that maintains and/or provides world state information associated with ledger 101.

Figure 7:
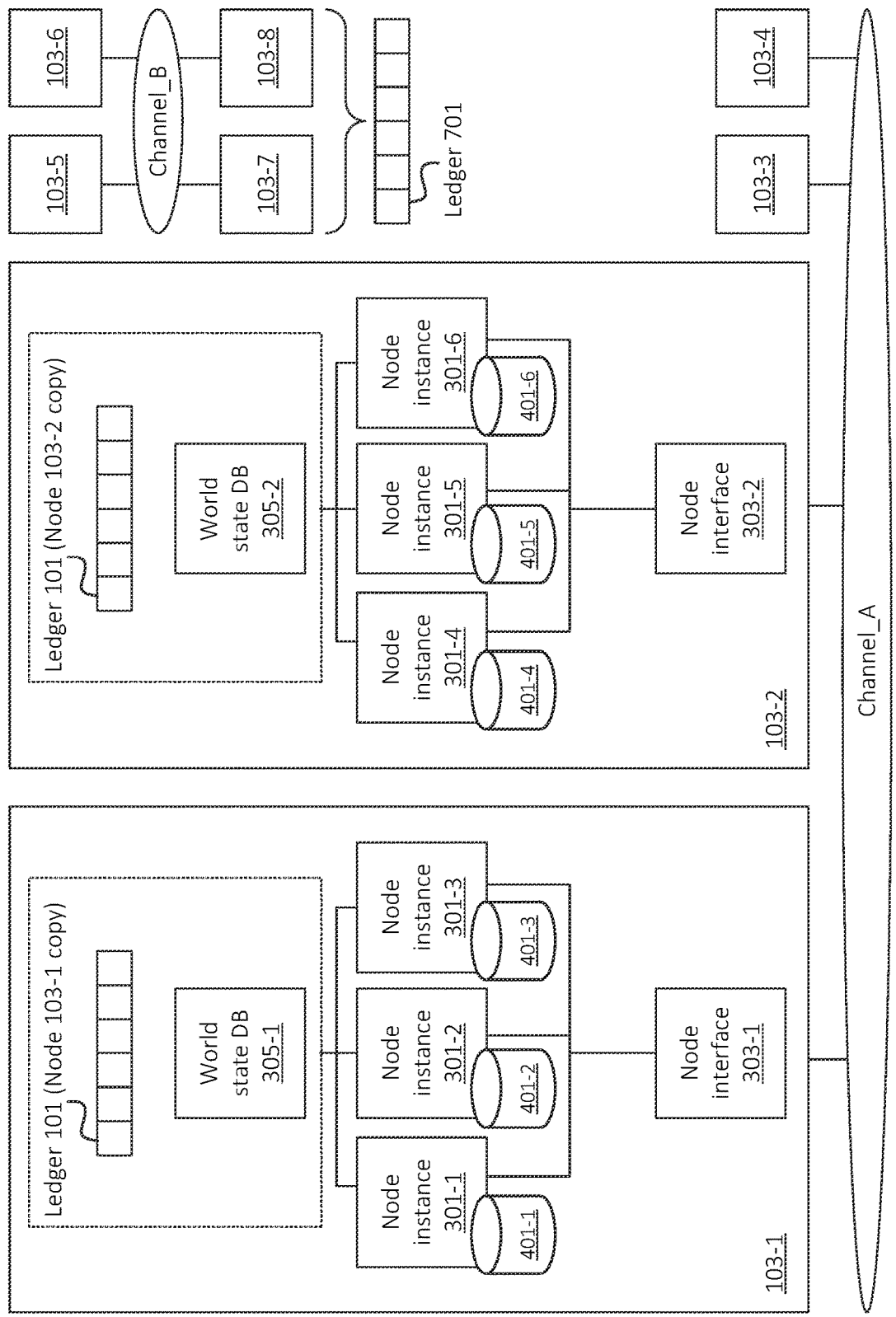
FIG. 7 illustrates an example arrangement of various devices or systems described herein.

FIG. 7 illustrates an example arrangement of various devices or systems described herein. For example, as shown, various nodes 103 may be associated with various channels, where a "channel" refers to a set of nodes 103 that communicate with each other (e.g., as similarly discussed above) in order to maintain a distinct ledger 101. For example, Channel_A may be associated with a first set of nodes 103-1 through 103-4, which may maintain a first ledger 101, while Channel_B may be associated with a second set of nodes 103-5 through 103-8, which may maintain a second ledger (e.g., ledger 701). As discussed above, some or all of the nodes may be implemented as an HA system, such as example nodes 103-1 and 103-2. As discussed above, node interface 303-1 may serve as an interface between node 103-1 and other nodes 103 associated with Channel_A. As further shown, nodes 103-1 and 103-2 may each be associated with a respective node copy of ledger 101. Each node copy of ledger 101 may be stored in the same device or system that maintains respective world state databases 305-1 and 305-2 and/or in different devices or systems. In some embodiments, different nodes 103 may be associated with different organizations, users, or other types of entities that have a stake or other type of interest in maintaining, accessing, interacting with, etc. a given ledger 101.

Figure 8:
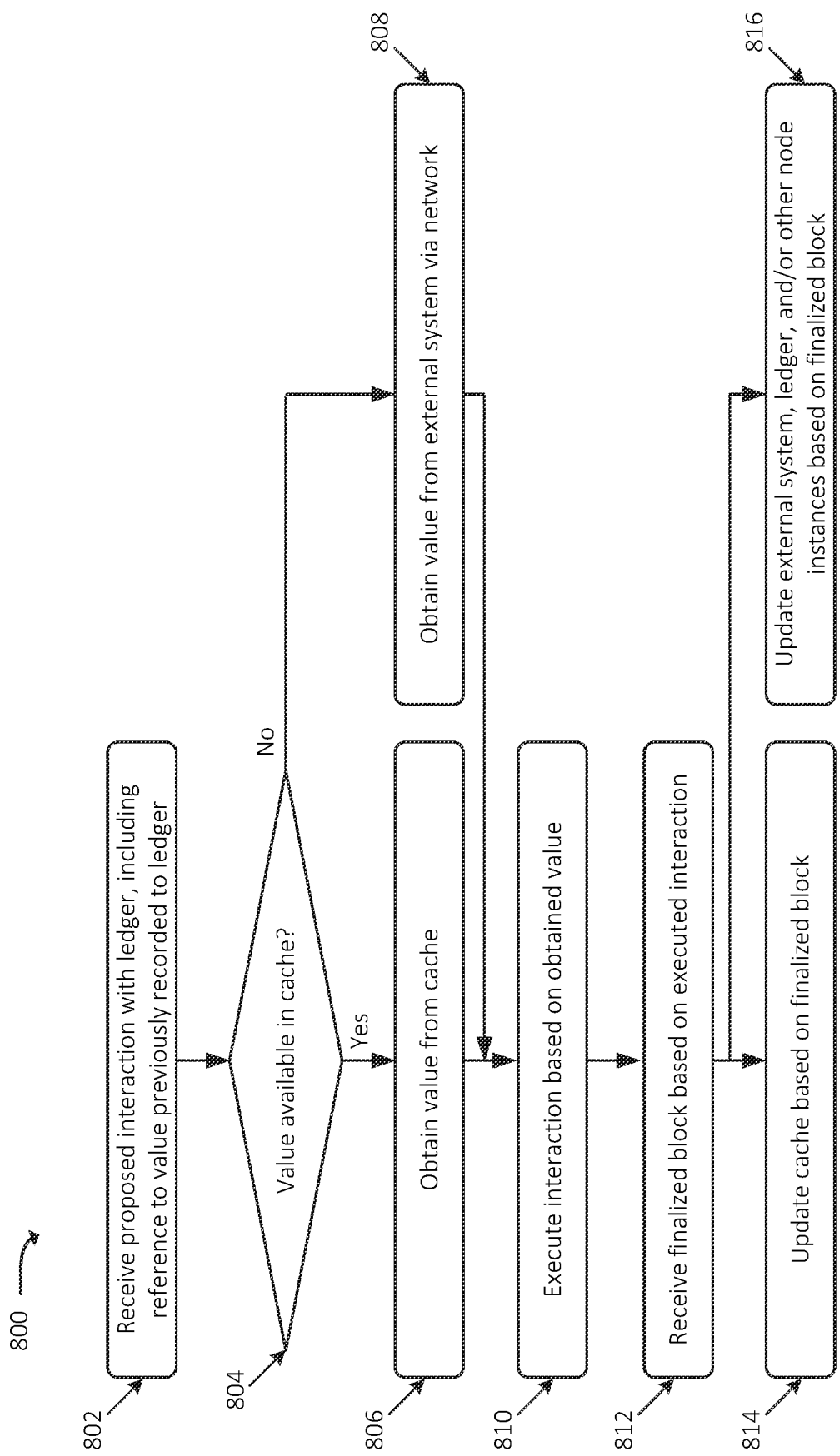
FIG. 8 illustrates an example process for using and/or maintaining an instance cache and/or an external system to obtain world state information associated with a given distributed ledger, in accordance with some embodiments.

FIG. 8 illustrates an example process for using and/or maintaining an instance cache and/or an external system (e.g., world state database 305) to obtain world state information associated with a given ledger 101. In some embodiments, some or all of process 800 may be performed by a particular node instance 301. In some embodiments, one or more other devices may perform some or all of process 800 in concert with, and/or in lieu of, node instance 301.

As shown, process 800 may include receiving (at 802) a proposed interaction with ledger 101. The proposed interaction may include a reference to a value previously recorded to ledger 101. For example, as discussed above, ledger 101 may maintain records, blocks, etc. that include respective values for one or more attributes. The proposed interaction may include a reference to a particular value, a reference to a particular attribute, and/or some other reference to information previously recorded to ledger 101.

Process 800 may further include determining (at 804) whether the value is available in instance cache 401, with which node instance 301 is associated. For example, as discussed above, instance cache 401 may be implemented by the same device, set of devices, virtual machine, etc. as node instance 301. In some embodiments, instance cache 401 may be communicatively coupled to node instance 301 via a device bus, physical interface or slot, or some other type of suitable communication pathway. In some embodiments, node instance 301 and instance cache 401 may be co-located, such as within the same datacenter, the same geographical region, etc.

As discussed above, the value may be available from instance cache 401 in situations where the value has been previously stored by instance cache 401. Instance cache 401 may store the value based on, for example, "pulling" the value from ledger 101 or from an external system that maintains world state information associated with ledger 101, such as world state database 305. Such system may be "external" to node instance 301 and/or instance cache 401 based on a different communication pathway between node instance 301 and world state database 305, as opposed to a communication pathway between node instance 301 and instance cache 401. For example, node instance 301 and world state database 305 may communicate via a network, such as the Internet or some other type of network, while node instance 301 and instance cache 401 may communicate via a device bus or some other type of communication pathway, as discussed above. As also noted above, in some embodiments, node instance 301 and world state database 305 may communicate via the network according to a first set of QoS parameters, SLAs, or the like, while node instance 301 and instance cache 401 may communicate via the same network according to a second set of QoS parameters, SLAs, or the like. In this manner, even over the same network, communications between node instance 301 and instance cache 401 may be handled differently (e.g., with a higher priority, speed, etc.) than communications between node instance 301 and world state database 305.

Instance cache 401 may store the value based on, for example, the value being "pushed" to instance cache 401 by world state database 305 or some other device or system. In some embodiments, instance cache 401 may store the value based on the value being received by node instance 301 (e.g., from another node instance 301 or node 103), and node instance 301 updating instance cache 401 to include the value. As discussed above, instance cache 401 may remove older values, less heavily accessed values, etc. in order to reduce the amount of information stored by instance cache 401. Instance cache 401 may accordingly store a partial world state associated with ledger 101, as some values, attributes, etc. included in ledger 101 may be omitted from instance cache 401, as discussed above. On the other hand, the external system (e.g., world state database 305) may store a full world state (or a more complete world state than world state database 305) associated with ledger 101, as world state database 305 may have greater storage capacity than instance cache 401.

In the event that the value is available in instance cache 401 (at 804—YES), then process 800 may include obtaining (at 806) the value from instance cache 401. On the other hand, if the value is not available in instance cache 401 (at 804—NO), then process 800 may include obtaining (at 808) the value from the external system (e.g., world state database 305) via the network. That is, as discussed above, when the value is available in instance cache 401 (at 804—YES), the communication via the network may not be necessary, thus saving time and granting a faster overall operation.

Process 800 may further include executing (at 810) the interaction based on the obtained value. For example, node instance 301 may execute a smart contract, a lookup, or other suitable type of operation based on the obtained (at 806 or 808) value.

Process 800 may additionally include receiving (at 812) a finalized block based on the executed interaction. For example, as discussed above, one or more other nodes 103 may provide a consensus for the executed interaction, and ordering node 203 may provide the finalized block based on the consensus. The finalized block may include one or more values, which may include an update or modification to the value specified in the proposed interaction, and/or may include some other value.

Process 800 may also include updating (at 814) instance cache 401 based on the finalized block. For example, node instance 301 may add one or more values included in the finalized block to instance cache 401, may update older versions of the one or more values stored by instance cache 401, etc. In this manner, the world state information associated with ledger 101 (e.g., partial world state information) may be kept up-to-date.

Process 800 may further include updating (at 816) the external system, ledger 101, and/or one or more other node instances 301 based on the finalized block. For example, node instance 301 may add (e.g., append) the finalized block to a node copy of ledger 101, and/or may provide the finalized block and/or one or more values included therein to world state database 305 and/or one or more other node instances 301. The other node instances 301 may accordingly update respective instance caches 401 with which the other node instances 301 are associated.

While examples are discussed above in the context of a node instance 301, out of a set of node instances 301 associated with a given node 103, obtaining (or attempting to obtain) values from an instance cache 401, similar concepts may apply to a node 103 that has only one instance. For example, such node 103 may include a local cache, and may be communicatively coupled to world state database 305 via a network. Accordingly, in some embodiments, node 103 may attempt to obtain values (e.g., associated with proposed ledger interactions) from the local cache prior to obtaining such values from world state database 305 via the network.

Figure 9:
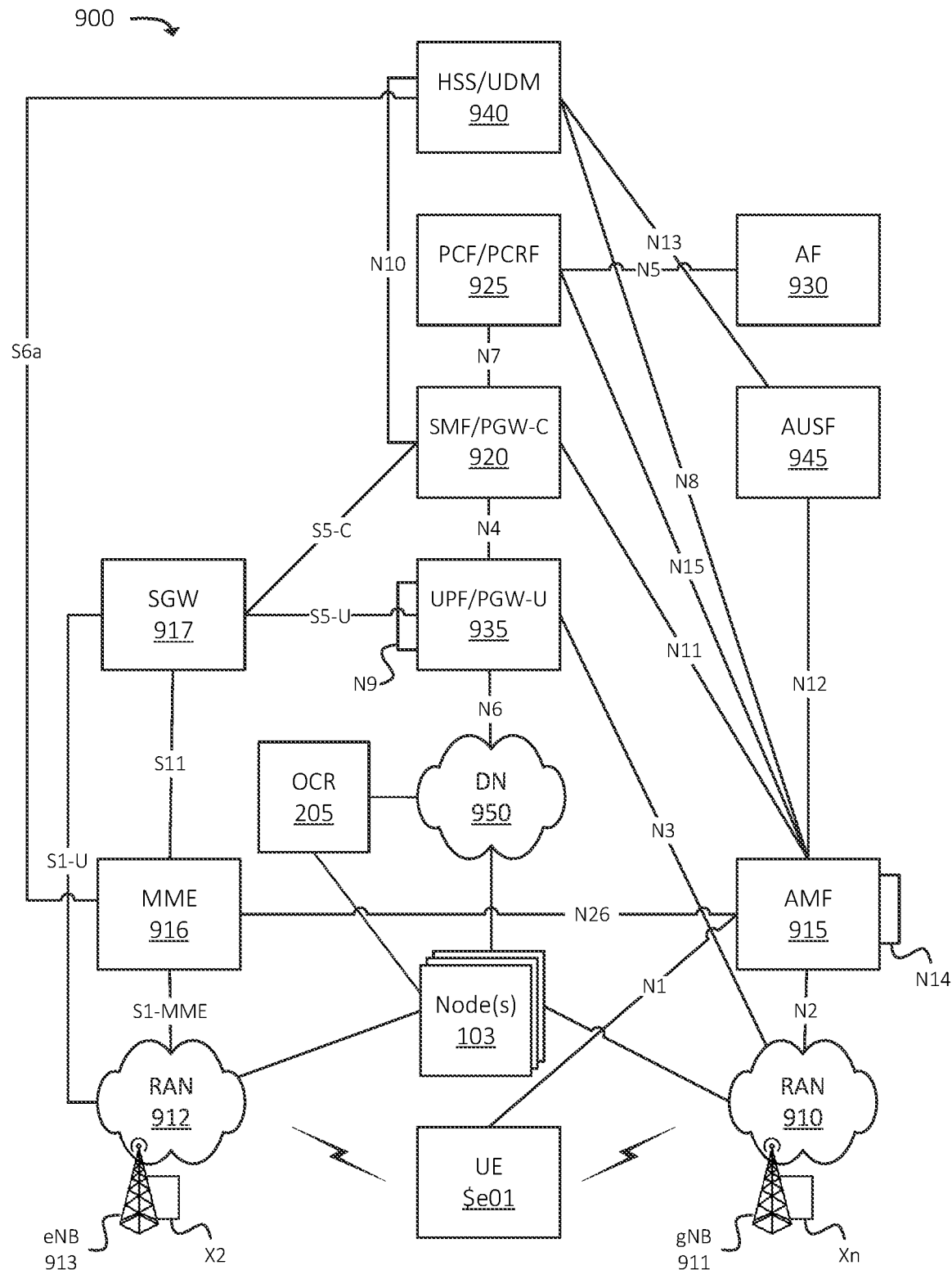
FIG. 9 illustrates an example environment in which one or more embodiments, described herein, may be implemented.

FIG. 9 illustrates an example environment 900, in which one or more embodiments may be implemented. In some embodiments, environment 900 may correspond to a Fifth Generation ("5G") network, and/or may include elements of a 5G network. In some embodiments, environment 900 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 900 may include UE 1uu, RAN 910 (which may include one or more Next Generation Node Bs ("gNBs") 911), RAN 912 (which may include one or more evolved Node Bs ("eNBs") 913), and various network functions such as Access and Mobility Management Function ("AMF") 915, Mobility Management Entity ("MME") 916, Serving Gateway ("SGW") 917, Session Management Function ("SMF")/Packet Data Network ("PDN") Gateway ("PGW")-Control plane function ("PGW-C") 920, Policy Control Function ("PCF")/Policy Charging and Rules Function ("PCRF") 925, Application Function ("AF") 930, User Plane Function ("UPF")/PGW-User plane function ("PGW-U") 935, Unified Data Management ("UDM")/Home Subscriber Server ("HSS") 940, and Authentication Server Function ("AUSF") 945. Environment 900 may also include one or more networks, such as Data Network ("DN") 950. Environment 900 may include one or more additional devices or systems communicatively coupled to one or more networks (e.g., DN 950), such as one or more nodes 103, off-chain repository 205, and/or other devices or systems.

The example shown in FIG. 9 illustrates one instance of each network component or function (e.g., one instance of SMF/PGW-C 920, PCF/PCRF 925, UPF/PGW-U 935, UDM/HSS 940, and/or AUSF 945). In practice, environment 900 may include multiple instances of such components or functions. For example, in some embodiments, environment 900 may include multiple "slices" of a core network, where each slice includes a discrete and/or logical set of network functions (e.g., one slice may include a first instance of SMF/PGW-C 920, PCF/PCRF 925, UPF/PGW-U 935, UDM/HSS 940, and/or AUSF 945, while another slice may include a second instance of SMF/PGW-C 920, PCF/PCRF 925, UPF/PGW-U 935, UDM/HSS 940, and/or AUSF 945). The different slices may provide differentiated levels of service, such as service in accordance with different Quality of Service ("QoS") parameters.

The quantity of devices and/or networks, illustrated in FIG. 9, is provided for explanatory purposes only. In practice, environment 900 may include additional devices and/or networks, fewer devices and/or networks, different devices and/or networks, or differently arranged devices and/or networks than illustrated in FIG. 9. For example, while not shown, environment 900 may include devices that facilitate or enable communication between various components shown in environment 900, such as routers, modems, gateways, switches, hubs, etc. Alternatively, or additionally, one or more of the devices of environment 900 may perform one or more network functions described as being performed by another one or more of the devices of environment 900. Devices of environment 900 may interconnect with each other and/or other devices via wired connections, wireless connections, or a combination of wired and wireless connections. In some implementations, one or more devices of environment 900 may be physically integrated in, and/or may be physically attached to, one or more other devices of environment 900.

UE 1uu may include a computation and communication device, such as a wireless mobile communication device that is capable of communicating with RAN 910, RAN 912, and/or DN 950. UE 1uu may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 1uu may send traffic to and/or receive traffic (e.g., user plane traffic) from DN 950 via RAN 910, RAN 912, and/or UPF/PGW-U 935. In some embodiments, UE 1uu may implement one or more nodes 103, client 201, and/or one or more other systems described above.

RAN 910 may be, or may include, a 5G RAN that includes one or more base stations (e.g., one or more gNBs 911), via which UE 1uu may communicate with one or more other elements of environment 900. UE 1uu may communicate with RAN 910 via an air interface (e.g., as provided by gNB 911). For instance, RAN 910 may receive traffic (e.g., voice call traffic, data traffic, messaging traffic, signaling traffic, etc.) from UE 1uu via the air interface, and may communicate the traffic to UPF/PGW-U 935, and/or one or more other devices or networks. Similarly, RAN 910 may receive traffic intended for UE 1uu (e.g., from UPF/PGW-U 935, AMF 915, and/or one or more other devices or networks) and may communicate the traffic to UE 1uu via the air interface.

RAN 912 may be, or may include, a LTE RAN that includes one or more base stations (e.g., one or more eNBs 913), via which UE 1uu may communicate with one or more other elements of environment 900. UE 1uu may communicate with RAN 912 via an air interface (e.g., as provided by eNB 913). For instance, RAN 910 may receive traffic (e.g., voice call traffic, data traffic, messaging traffic, signaling traffic, etc.) from UE 1uu via the air interface, and may communicate the traffic to UPF/PGW-U 935, and/or one or more other devices or networks. Similarly, RAN 910 may receive traffic intended for UE 1uu (e.g., from UPF/PGW-U 935, SGW 917, and/or one or more other devices or networks) and may communicate the traffic to UE 1uu via the air interface.

AMF 915 may include one or more devices, systems, Virtualized Network Functions ("VNFs"), Cloud-Native Network Functions ("CNFs"), etc., that perform operations to register UE 1uu with the 5G network, to establish bearer channels associated with a session with UE 1uu, to hand off UE 1uu from the 5G network to another network, to hand off UE 1uu from the other network to the 5G network, manage mobility of UE 1uu between RANs 910 and/or gNBs 911, and/or to perform other operations. In some embodiments, the 5G network may include multiple AMFs 915, which communicate with each other via the N14 interface (denoted in FIG. 9 by the line marked "N14" originating and terminating at AMF 915).

MME 916 may include one or more devices, systems, VNFs, CNFs, etc., that perform operations to register UE 1uu with the EPC, to establish bearer channels associated with a session with UE 1uu, to hand off UE 1uu from the EPC to another network, to hand off UE 1uu from another network to the EPC, manage mobility of UE 1uu between RANs 912 and/or eNBs 913, and/or to perform other operations.

SGW 917 may include one or more devices, systems, VNFs, CNFs, etc., that aggregate traffic received from one or more eNBs 913 and send the aggregated traffic to an external network or device via UPF/PGW-U 935. Additionally, SGW 917 may aggregate traffic received from one or more UPF/PGW-Us 935 and may send the aggregated traffic to one or more eNBs 913. SGW 917 may operate as an anchor for the user plane during inter-eNB handovers and as an anchor for mobility between different telecommunication networks or RANs (e.g., RANs 910 and 912).

SMF/PGW-C 920 may include one or more devices, systems, VNFs, CNFs, etc., that gather, process, store, and/or provide information in a manner described herein. SMF/PGW-C 920 may, for example, facilitate the establishment of communication sessions on behalf of UE 1uu. In some embodiments, the establishment of communications sessions may be performed in accordance with one or more policies provided by PCF/PCRF 925.

PCF/PCRF 925 may include one or more devices, systems, VNFs, CNFs, etc., that aggregate information to and from the 5G network and/or other sources. PCF/PCRF 925 may receive information regarding policies and/or subscriptions from one or more sources, such as subscriber databases and/or from one or more users (such as, for example, an administrator associated with PCF/PCRF 925).

AF 930 may include one or more devices, systems, VNFs, CNFs, etc., that receive, store, and/or provide information that may be used in determining parameters (e.g., quality of service parameters, charging parameters, or the like) for certain applications.

UPF/PGW-U 935 may include one or more devices, systems, VNFs, CNFs, etc., that receive, store, and/or provide data (e.g., user plane data). For example, UPF/PGW-U 935 may receive user plane data (e.g., voice call traffic, data traffic, etc.), destined for UE 1uu, from DN 950, and may forward the user plane data toward UE 1uu (e.g., via RAN 910, SMF/PGW-C 920, and/or one or more other devices). In some embodiments, multiple UPFs 935 may be deployed (e.g., in different geographical locations), and the delivery of content to UE 1uu may be coordinated via the N9 interface (e.g., as denoted in FIG. 9 by the line marked "N9" originating and terminating at UPF/PGW-U 935). Similarly, UPF/PGW-U 935 may receive traffic from UE 1uu (e.g., via RAN 910, SMF/PGW-C 920, and/or one or more other devices), and may forward the traffic toward DN 950. In some embodiments, UPF/PGW-U 935 may communicate (e.g., via the N4 interface) with SMF/PGW-C 920, regarding user plane data processed by UPF/PGW-U 935.

UDM/HSS 940 and AUSF 945 may include one or more devices, systems, VNFs, CNFs, etc., that manage, update, and/or store, in one or more memory devices associated with AUSF 945 and/or UDM/HSS 940, profile information associated with a subscriber. AUSF 945 and/or UDM/HSS 940 may perform authentication, authorization, and/or accounting operations associated with the subscriber and/or a communication session with UE 1uu.

DN 950 may include one or more wired and/or wireless networks. For example, DN 950 may include an Internet Protocol ("IP")-based PDN, a wide area network ("WAN") such as the Internet, a private enterprise network, and/or one or more other networks. UE 1uu may communicate, through DN 950, with data servers, other UEs 1uu, and/or to other servers or applications that are coupled to DN 950. DN 950 may be connected to one or more other networks, such as a public switched telephone network ("PSTN"), a public land mobile network ("PLMN"), and/or another network. DN 950 may be connected to one or more devices, such as content providers, applications, web servers, and/or other devices, with which UE 1uu may communicate.

Figure 10:
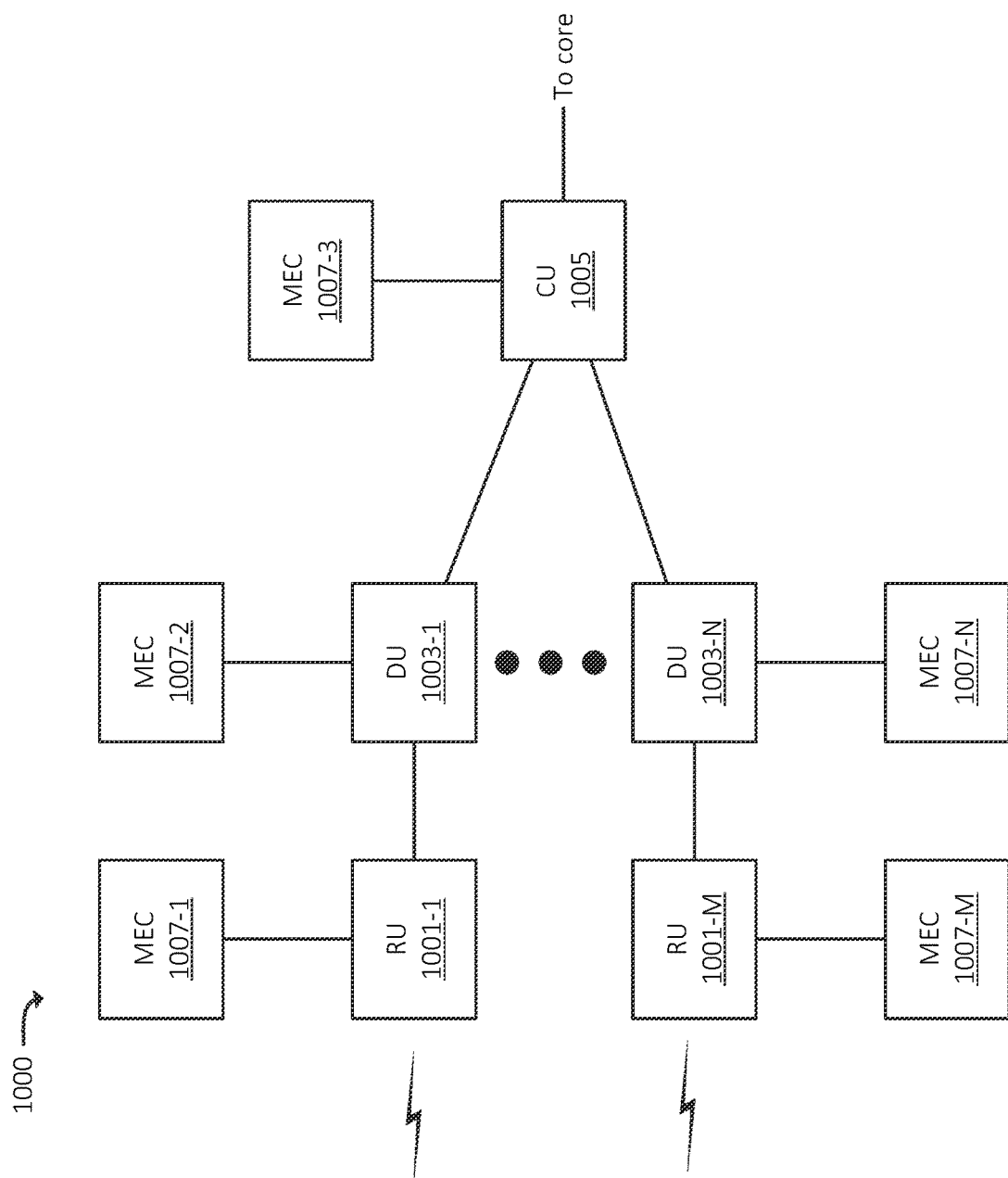
FIG. 10 illustrates an example arrangement of a radio access network ("RAN"), in accordance with some embodiments.

FIG. 10 illustrates an example Distributed Unit ("DU") network 1000, which may be included in and/or implemented by one or more RANs (e.g., RAN 910, RAN 912, or some other RAN). In some embodiments, a particular RAN may include one DU network 1000. In some embodiments, a particular RAN may include multiple DU networks 1000. In some embodiments, DU network 1000 may correspond to a particular gNB 911 of a 5G RAN (e.g., RAN 910). In some embodiments, DU network 1000 may correspond to multiple gNBs 911. In some embodiments, DU network 1000 may correspond to one or more other types of base stations of one or more other types of RANs. As shown, DU network 1000 may include Central Unit ("CU") 1005, one or more Distributed Units ("DUs") 1003-1 through 1003-N (referred to individually as "DU 1003," or collectively as "DUs 1003"), and one or more Radio Units ("RUs") 1001-1 through 1001-M (referred to individually as "RU 1001," or collectively as "RUs 1001").

CU 1005 may communicate with a core of a wireless network (e.g., may communicate with one or more of the devices or systems described above with respect to FIG. 9, such as AMF 915 and/or UPF/PGW-U 935). In the uplink direction (e.g., for traffic from UEs 1uu to a core network), CU 1005 may aggregate traffic from DUs 1003, and forward the aggregated traffic to the core network. In some embodiments, CU 1005 may receive traffic according to a given protocol (e.g., Radio Link Control ("RLC")) from DUs 1003, and may perform higher-layer processing (e.g., may aggregate/process RLC packets and generate Packet Data Convergence Protocol ("PDCP") packets based on the RLC packets) on the traffic received from DUs 1003.

In accordance with some embodiments, CU 1005 may receive downlink traffic (e.g., traffic from the core network) for a particular UE 1uu, and may determine which DU(s) 1003 should receive the downlink traffic. DU 1003 may include one or more devices that transmit traffic between a core network (e.g., via CU 1005) and UE 1uu (e.g., via a respective RU 1001). DU 1003 may, for example, receive traffic from RU 1001 at a first layer (e.g., physical ("PHY") layer traffic, or lower PHY layer traffic), and may process/aggregate the traffic to a second layer (e.g., upper PHY and/or RLC). DU 1003 may receive traffic from CU 1005 at the second layer, may process the traffic to the first layer, and provide the processed traffic to a respective RU 1001 for transmission to UE 1uu.

RU 1001 may include hardware circuitry (e.g., one or more RF transceivers, antennas, radios, and/or other suitable hardware) to communicate wirelessly (e.g., via an RF interface) with one or more UEs 1uu, one or more other DUs 1003 (e.g., via RUs 1001 associated with DUs 1003), and/or any other suitable type of device. In the uplink direction, RU 1001 may receive traffic from UE 1uu and/or another DU 1003 via the RF interface and may provide the traffic to DU 1003. In the downlink direction, RU 1001 may receive traffic from DU 1003, and may provide the traffic to UE 1uu and/or another DU 1003.

RUs 1001 may, in some embodiments, be communicatively coupled to one or more Multi-Access/Mobile Edge Computing ("MEC") devices, referred to sometimes herein simply as "MECs" 1007. For example, RU 1001-1 may be communicatively coupled to MEC 1007-1, RU 1001-M may be communicatively coupled to MEC 1007-M, DU 1003-1 may be communicatively coupled to MEC 1007-2, DU 1003-N may be communicatively coupled to MEC 1007-N, CU 1005 may be communicatively coupled to MEC 1007-3, and so on. MECs 1007 may include hardware resources (e.g., configurable or provisionable hardware resources) that may be configured to provide services and/or otherwise process traffic to and/or from UE 1uu, via a respective RU 1001.

For example, RU 1001-1 may route some traffic, from UE 1uu, to MEC 1007-1 instead of to a core network (e.g., via DU 1003 and CU 1005). MEC 1007-1 may process the traffic, perform one or more computations based on the received traffic, and may provide traffic to UE 1uu via RU 1001-1. In this manner, ultra-low latency services may be provided to UE 1uu, as traffic does not need to traverse DU 1003, CU 1005, and an intervening backhaul network between DU network 1000 and the core network. In some embodiments, MEC 1007 may include, and/or may implement, some or all of the functionality described above with respect to node 103, ordering node 203, node instance 301, instance cache 401, world state database 305, UPF 935, and/or one or more other devices, systems, VNFs, CNFs, etc.

Figure 11:
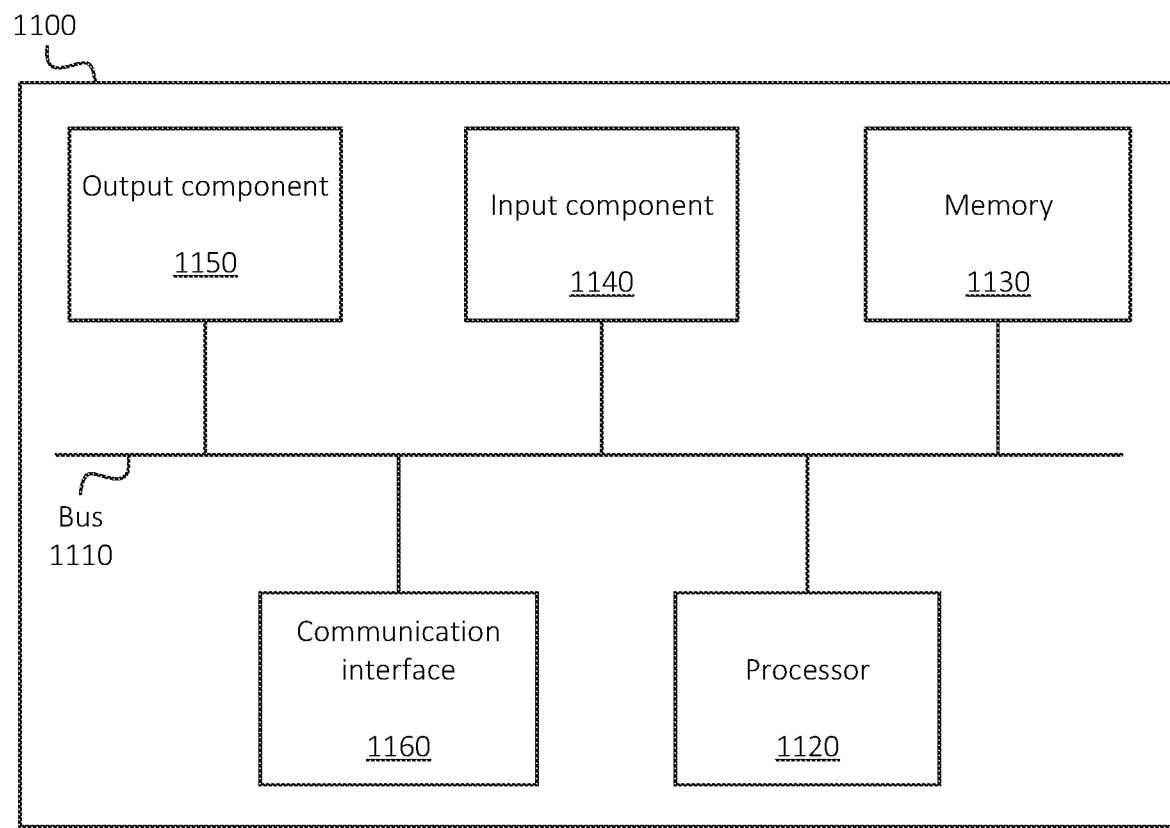
FIG. 11 illustrates example components of one or more devices, in accordance with one or more embodiments described herein.

FIG. 11 illustrates example components of device 1100. One or more of the devices described above may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. In some embodiments, processor 1120 may be or may include one or more hardware processors. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100 and/or other receives or detects input from a source external to 1140, such as a touchpad, a touchscreen, a keyboard, a keypad, a button, a switch, a microphone or other audio input component, etc. In some embodiments, input component 1140 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-8), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
receive a first proposed interaction with a distributed ledger, wherein the first proposed interaction includes a reference to a first value that has been previously recorded to the distributed ledger;
attempt to obtain the first value from a cache associated with the device;
based on attempting to obtain the first value from the cache, determine that the first value should be obtained from an external device;
based on determining that the first value should be obtained from the external device, communicate with the external device via a particular network to obtain the first value;
execute the first proposed interaction based on the obtained first value;
receive a second proposed interaction with the distributed ledger, wherein the second proposed interaction includes a reference to a second value that has been previously recorded to the distributed ledger;
obtain the second value from the cache without communicating with the external device via the particular network; and
execute the second proposed interaction based on the obtained second value.

2. The device of claim 1, wherein attempting to obtain the first value and obtaining the second value are performed via a communication pathway other than the particular network.

3. The device of claim 2, wherein the communication pathway includes at least one of:
a device bus associated with the device, or
a physical interface between the cache and the device.

4. The device of claim 1, wherein the device implements a particular instance of a node that maintains the distributed ledger, wherein the node is further associated with one or more other instances of the node.

5. The device of claim 4, wherein the node is associated with a node interface that is configured to:
receive the first proposed interaction; and
select the particular node instance in lieu of the one or more other instances of the node, and
wherein the particular node instance receives the first proposed interaction from the node interface based on the selection of the particular node instance by the node interface.

6. The device of claim 1, wherein the one or more processors are further configured to:
receive an indication of a finalized block to commit to the distributed ledger; and
provide one or more values, associated with the finalized block, to the cache.

7. The device of claim 6, wherein the device implements a particular instance of a node that maintains the distributed ledger, wherein the node is further associated with one or more other instances of the node, wherein the one or more processors are further configured to:
provide the one or more values, associated with the finalized block, to the one or more other instances of the node.

8. A system, comprising:
a node instance associated with a distributed ledger, wherein the node instance includes a cache; and
a storage system that is communicatively coupled to the node instance via a network,
wherein the node instance is configured to:
receive a first proposed interaction with the distributed ledger, wherein the first proposed interaction includes a reference to a first value that has been previously recorded to the distributed ledger;
attempt to obtain the first value from the cache;
based on attempting to obtain the first value from the cache, determine that the first value should be obtained from the storage system;
based on determining that the first value should be obtained from the storage system, communicate with the storage system via the network to obtain the first value;
execute the first proposed interaction based on the obtained first value;
receive a second proposed interaction with the distributed ledger, wherein the second proposed interaction includes a reference to a second value that has been previously recorded to the distributed ledger;
obtain the second value from the cache without communicating with the storage system via the network; and
execute the second proposed interaction based on the obtained second value.

9. The system of claim 8, wherein the node instance and the cache are implemented by a first set of devices, and wherein the storage system is implemented by a second set of devices that are communicatively coupled to the first set of devices via the network.

10. The system of claim 8, wherein the node instance is associated with a node that maintains the distributed ledger, wherein the node is further associated with one or more other node instances.

11. The system of claim 10, wherein the node is associated with a node interface that is configured to:
receive the first proposed interaction; and
select the node instance in lieu of the one or more other instances of the node, and
wherein the node instance receives the first proposed interaction from the node interface based on the selection of the node instance by the node interface.

12. The system of claim 8, wherein the node instance is further configured to:
receive an indication of a finalized block to commit to the distributed ledger; and
provide one or more values, associated with the finalized block, to the cache.

13. The system of claim 12, wherein the node instance is associated with a node that maintains the distributed ledger, wherein the node is further associated with one or more other node instances, wherein the node instance is further configured to:
provide the one or more values, associated with the finalized block, to the one or more other node instances.

14. The system of claim 8, wherein the cache includes a partial world state associated with the distributed ledger, and wherein the storage system includes a full world state associated with the distributed ledger.

15. A method, comprising:
receiving, by a device, a first proposed interaction with a distributed ledger, wherein the first proposed interaction includes a reference to a first value that has been previously recorded to the distributed ledger;
attempting to obtain the first value from a cache associated with the device;

based on attempting to obtain the first value from the cache, determining that the first value should be obtained from an external device;

based on determining that the first value should be obtained from the external device, communicating with the external device via a particular network to obtain the first value;

executing the first proposed interaction based on the obtained first value;

receiving a second proposed interaction with the distributed ledger, wherein the second proposed interaction includes a reference to a second value that has been previously recorded to the distributed ledger;

obtaining the second value from the cache without communicating with the external device via the particular network; and executing the second proposed interaction based on the obtained second value.

16. The method of claim 15, wherein attempting to obtain the first value and obtaining the second value are performed via a communication pathway other than the particular network.

17. The method of claim 15, wherein the device implements a particular instance of a node that maintains the distributed ledger, wherein the node is further associated with one or more other instances of the node.

18. The method of claim 17, wherein the node is associated with a node interface that is configured to:
receive the first proposed interaction; and
select the particular node instance in lieu of the one or more other instances of the node, and
wherein the particular node instance receives the first proposed interaction from the node interface based on the selection of the particular node instance by the node interface.

19. The method of claim 15, further comprising:
receiving an indication of a finalized block to commit to the distributed ledger; and
providing one or more values, associated with the finalized block, to the cache.

20. The method of claim 19, wherein the device implements a particular instance of a node that maintains the distributed ledger, wherein the node is further associated with one or more other instances of the node, the method further comprising:
providing the one or more values, associated with the finalized block, to the one or more other instances of the node.

* * * * *